United States Patent
Bentschneider

(10) Patent No.: US 6,453,529 B1
(45) Date of Patent: Sep. 24, 2002

(54) CAM CONTROLLED CUSHION ASSEMBLY SYSTEM

(75) Inventor: Stephen E. Bentschneider, Clarklake, MI (US)

(73) Assignee: Labor Aiding Systems, Inc., Jackson, MI (US)

( * ) Notice: Subject to any disclaimer, the term of this patent is extended or adjusted under 35 U.S.C. 154(b) by 0 days.

(21) Appl. No.: 09/561,874

(22) Filed: May 1, 2000

(51) Int. Cl.[7] .......................... B68G 7/00; B68G 15/00; B23P 19/02; B25B 27/14
(52) U.S. Cl. .......................... 29/91.5; 29/91.1; 29/91.8; 29/235; 29/281.1
(58) Field of Search .......................... 29/91.1, 91, 91.5, 29/91.7, 91.8, 235, 281.1, 281.3, 281.4; 53/523; 100/214

(56) References Cited

U.S. PATENT DOCUMENTS

| | | | | |
|---|---|---|---|---|
| 4,385,427 A | * | 5/1983 | Fraiser | 29/91.5 |
| 5,199,144 A | * | 4/1993 | Abe et al. | 29/235 |

* cited by examiner

Primary Examiner—David P. Bryant
Assistant Examiner—John C. Hong
(74) Attorney, Agent, or Firm—Young & Basile, P.C.

(57) ABSTRACT

Apparatus and a method for assembling a stretchable cover upon a rigidly backed foam cushion wherein the cushion lateral dimensions vary along its length. The degree of stretching of the cover varies during cushion/cover assembly as controlled by cams and cam followers to permit wrinkle-free covering of backed foam cushions of irregular configuration.

6 Claims, 3 Drawing Sheets

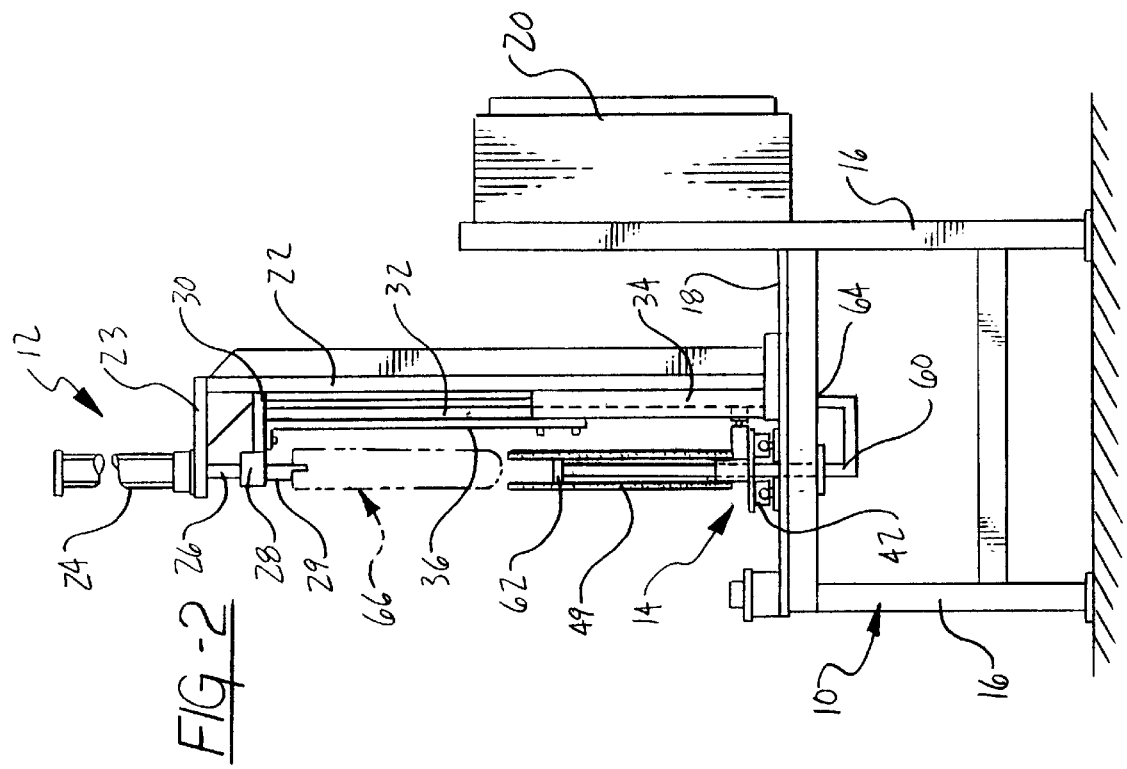
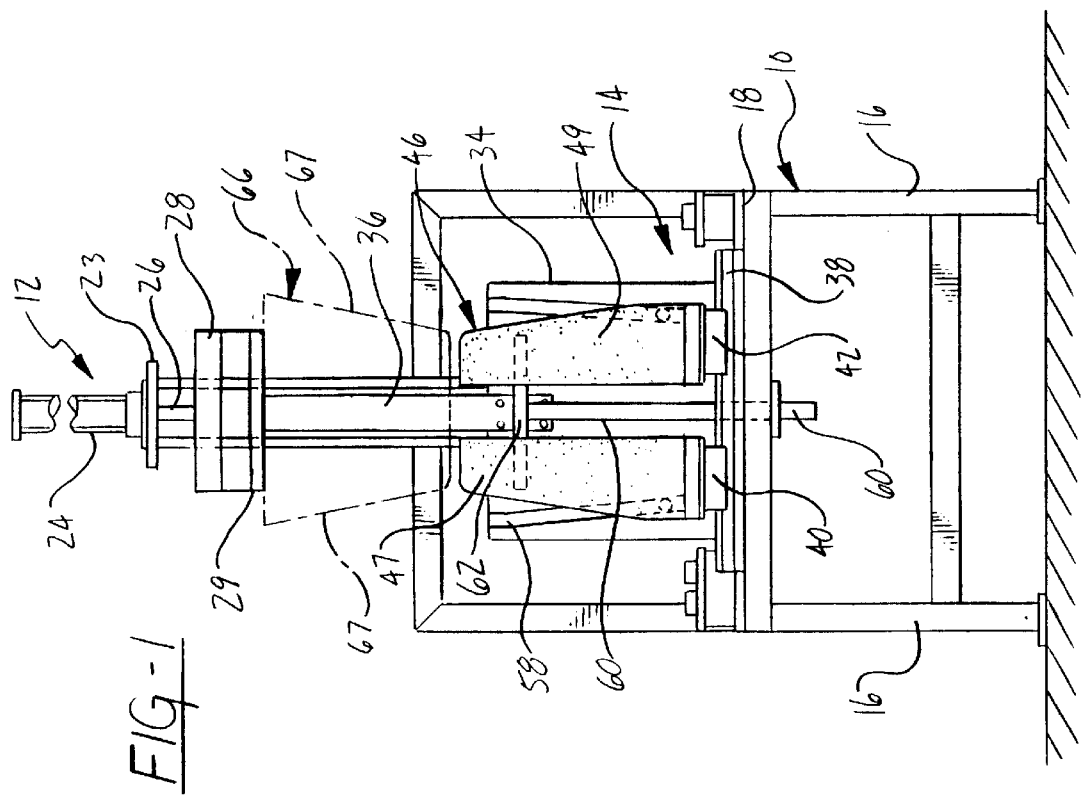

CAM CONTROLLED CUSHION ASSEMBLY SYSTEM

BACKGROUND OF THE INVENTION

1. Field of the Invention

The invention pertains to an apparatus and method for assembling a stretchable cover upon a rigidly backed foam cushion.

2. Description of the Related Art

Cushioned and covered components are used in a variety of products such as automobiles, furniture and building components wherein a plush, soft, attractive surface is desired. In such instances, it is common to use a relatively rigid backing of wood or paperboard in combination with an expanded foam affixed to the backing whereby the foam cushion will maintain a predetermined shape and configuration.

When covering a backed foam cushion with a flexible cover, such as made of fabric, vinyl, leather or the like, it is necessary that the cover be dimensionally fabricated accurately so as to closely fit and encase the backed cushion to minimize the occurrence of wrinkles and unsightly ribs or waves in the cover. obtaining a wrinkle-free covering of a backed cushion is difficult in that the cover must closely and firmly encase the backed cushion, and because of the close tolerances, difficulty is encountered in assembling the backed foam cushion and cover.

Known apparatus for assembling backed foam cushions and covers have not been readily adaptable to high production assembly techniques, and considerable hand work is often required to make the cover acceptably fit and enclose the backed foam cushion. Such hand work is slow and expensive, and if care is not taken to properly position the cover on the backed foam cushion, wrinkles and ridges will appear which aesthetically detract from the finished product.

OBJECTS OF THE INVENTION

It is an object of the invention to provide a method and apparatus for assembling a rigidly backed foam cushion and a stretchable cover wherein the cover may be quickly and accurately placed upon the backed foam cushion in a tight fitting and wrinkle-free manner.

Yet another object of the invention is to provide apparatus and a method for assembling backed foam cushions and stretchable covers wherein backed foam cushion assemblies of irregular lateral configuration can be quickly and accurately covered with a stretchable cover, and wherein the cover is stretched in accord with the configuration of the backed cushion assembly.

Yet a further object of the invention is to provide apparatus and a method for assembling a rigidly backed foam cushion and stretchable cover wherein the degree of stretching of the cover that occurs during assembly can be varied in a predetermined manner by cams and cam followers, and in accord with the lateral configuration of the backed cushion.

SUMMARY OF THE INVENTION

In the practice of the invention, it is the purpose to assemble a rigidly backed foam cushion with a stretchable cover wherein, even though the lateral dimension of the cushion configuration may be variable, the stretching of the cover during assembly can be controlled to be provide an optimum fit between the cover and backed foam cushion to eliminate wrinkles and ridges.

The apparatus of the invention is preferably vertically oriented having an upper ram portion and an assembly portion located below the ram portion.

A pair of carriages are mounted on the frame assembly portion in side-by-side relationship movable upon elongated guides or ways whereby the carriages may move toward or away from each other in a lateral direction. Each of the carriages supports a pair of spaced plate-like stanchions which are mounted at their lower end upon the associated carriage and extend upwardly toward the frame ram portion. Two stanchions are mounted upon each carriage and the upper ends of the stanchions are unsupported whereby the stanchions are cantilever supported in a vertical position. The stanchions mounted upon a common carriage are spaced from each other by a dimension slightly greater than the thickness of the backing and foam cushion assembly, and the stanchions of the two carriages are in lateral alignment whereby the four stanchions together define a "slot" of a thickness slightly greater than the backed cushion assembly.

Each of the carriages includes a roller cam follower received within a cam slot formed in a cam plate mounted on the frame upon vertically disposed guides whereby the cam plate is capable of moving toward and away from the frame assembly portion.

In the preferred arrangement, the cam plate is connected to the ram such that the cam plate will move with the ram toward and away from the frame assembly portion. As the cam slots in the cam plate will be of a configuration usually complementary to the lateral configuration of the backed cushion assembly, the engagement of the carriage cam followers in the cam plate cam slots will cause the carriages to move laterally as the ram is lowered toward the carriages and frame assembly portion.

To further customize the stretching of the cover as the backed foam cushion is inserted therein, the outer edges of the stanchions, i.e. those stanchion edges laterally facing away from each other and the center of the frame and which engage the cover, may also be configured in accord with the shape of the foam cushion and cover to facilitate entry of the cushion into the cover and assure fitting of the cover to the cushion to produce a wrinkle-free product.

The cover is turned inside out and placed over the top of the stanchions and as the cushion is pushed into the pocket defined by the cover by the ram, the cover folds inwardly over the top of the stanchions while being stretched laterally by the stanchions. Accordingly, the cover is automatically removed from the stanchions as it is stretched thereby and as the cushion assembly is received within the cover. At the end of the ram stroke, the cushion assembly will be completely encased within the cover, the cover will have now been removed from the stanchions, and the assembly between the cushion and its cover is now complete, and the cushion/cover assembly will be located between the carriage stanchions.

The ram is now retracted away from the frame assembly portion. This movement causes an ejector head located between the stanchions to move upwardly with the ram as it retracts. The ejector head will engage the assembled cushion and cover and remove the same from between the stanchions as the ram retracts. This permits the operator to remove the assembled cushion and cover from the machine once the ram is fully retracted. Thereupon, a new cover may be inserted upon the stanchions and a backed foam cushion mounted upon the ram, and the assembly cycle repeated.

The practice of the invention permits a backed foam cushion to be quickly and accurately encased within a stretchable cover in a wrinkle-free manner, and even though the cushion may have a variable lateral dimension, the automatic control of the stretching of the cover by the movable stanchions, whose position is determined by the cam followers and cam slots, permits an improved assembly procedure than that previously obtainable, and permits a higher quality finished product to be achieved.

BRIEF DESCRIPTION OF THE DRAWINGS

The aforementioned objects and advantages of the invention will be appreciated from the following description and accompanying drawings wherein:

FIG. 1 is a front elevational view of a cushion and cover assembly machine in accord with the invention, a backed foam cushion being shown in dotted lines, and no cover is mounted upon the carriage stanchions, FIG. 2 is an elevational view of the assembly apparatus of FIG. 1 as taken from the right side thereof.

DESCRIPTION OF THE PREFERRED EMBODIMENT

Figure 4:
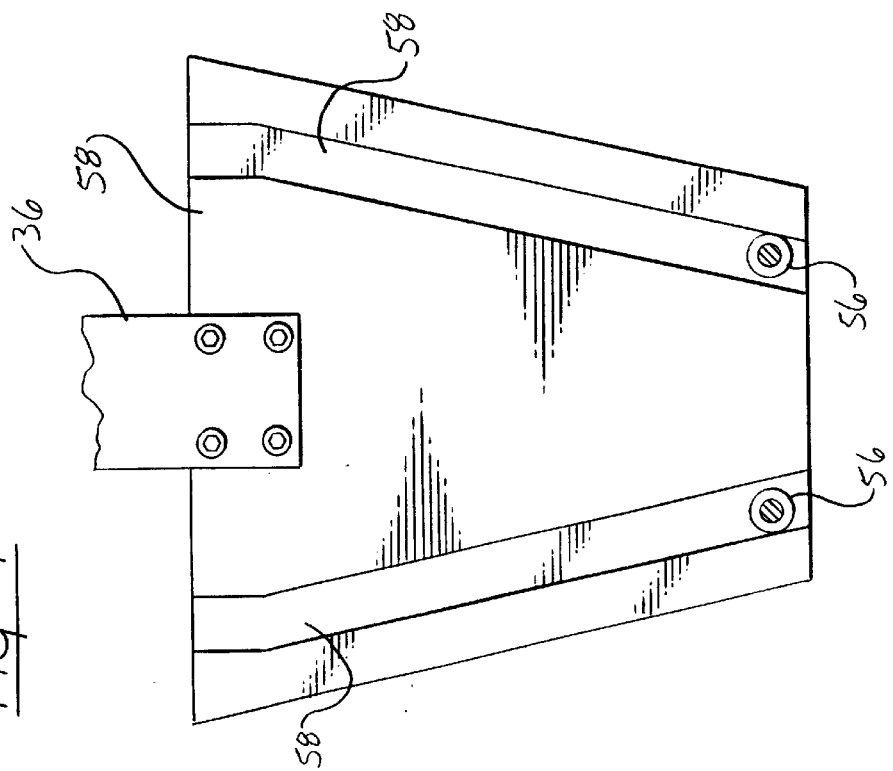
FIG. 4 is an elevational view illustrating the cam plate as taken along Section 4—4 of FIG. 3.

The overall appearance of cushion assembly apparatus in accord with the invention is best shown in FIGS. 1 and 2. The apparatus constitutes a frame generally indicated at 10 upon which is mounted a ram portion 12 and an assembly portion 14. In the drawings, the frame is shown in a vertical orientation, which is the usual manner of positioning the frame such that the ram portion 12 extends above the assembly portion 14. However, it is to be appreciated that the invention could be practiced if the ram portion 12 and assembly portion 14 were horizontally related.

The frame 10 includes four legs 16 upon which a table 18 is mounted which comprises the support for the assembly portion 14. Extensions of the rear legs 16 constitute a support for the control box 20 in which the controls for the apparatus are located.

A ram support column 22 arises from the table 18 having an upper end 23 upon which a ram cylinder 24 is mounted. The ram cylinder 24 is preferably air operated, is of the expansible chamber type, and includes a downwardly extending piston 26 terminating in a piston head or block 28 from which the cushion anchor 29 is attached. The column 22 includes a bracket 30 which constitutes the upper support for a pair of parallel cylindrical guides 32 which extend downwardly through the table 18 and are affixed at their lower end to the lower region of the frame 10. The guides 32 are parallel to each other, and the direction of movement of the piston 26, and a cam plate 34, preferably formed of aluminum, is reciprocally mounted upon the guides 32 and adapted to be translated along the guides 32 with movement of the piston 26 by means of a tie rod 36 affixed to the cushion anchor 29 and the cam plate 34.

Figure 3:
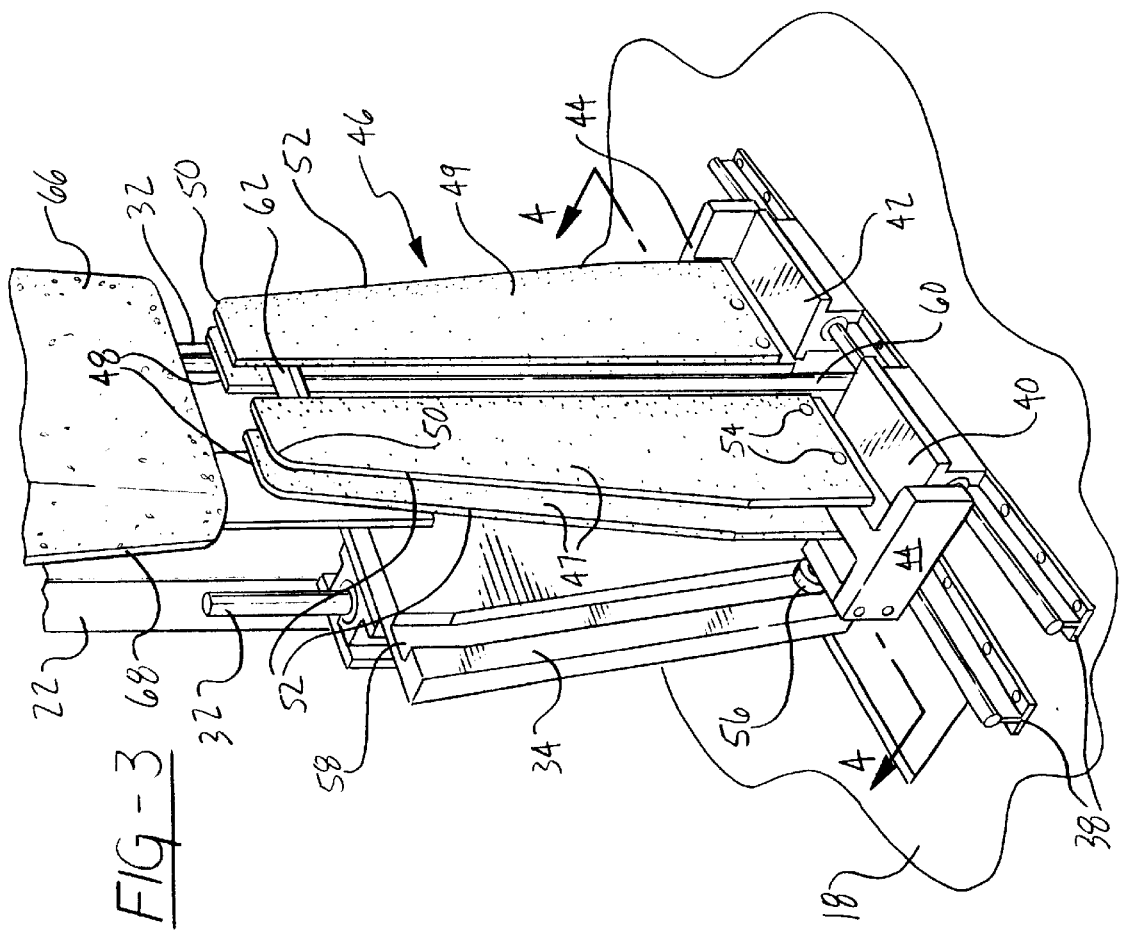
FIG. 3 is a detail perspective view of the frame assembly portion illustrating the carriages, cam plate and cam slots, a cushion being shown in position, and prior to a cover being mounted upon the carriage stanchions.

A pair of ways or guides 38 are mounted on the table 18, FIG. 3, having a length at right angles to the cam plate guides 32. The ways 38 are parallel to each other, and support carriages 40 and 42 wherein the carriages are linearly reciprocally mounted on the ways 38 in a manner later described. The carriages 40 and 42 are movable toward and away from each other in a linear manner on the ways 38 and in a direction lateral to the frame 10 and ram 24.

Each of the carriages 40 and 42 include a T-bracket 44 affixed thereto and extending above the associated carriage. The brackets 44 constitute the support for the cover stretching stanchions 46. As will be appreciated from FIG. 3, identical stanchions 47 are mounted upon carriage 40, while identical stanchions 49 are mounted upon carriage 42.

The stanchions 46 mounted on a common carriage are identical to each other, and the stanchions mounted on opposite carriages are mirror images of each other. Each stanchion includes a cantilevered top edge 48 and a radius 50 which blends into the stanchion outer edge 52. The outer edges 52 of stanchions 47 are disposed in the lateral direction with respect to the height of the frame 10 opposite to the direction of the outer edges of stanchions 49.

The stanchions 46 are of a plate-like material, and may be formed of a rigid synthetic plastic material, and are affixed in a cantilevered manner to their associated carriage T-bracket 44 by fasteners 54 located adjacent the lower edges of the stanchions. The stanchions mounted upon a common carriage 40 or 42 are in a spaced relationship to each other as will be appreciated from FIG. 3. For instance, the stanchions 47 mounted upon carriage 40 are spaced apart a distance adapted to receive the foam cushion assembly which is inserted between stanchions 47. In a similar manner, stanchions 49 mounted upon carriage 42 are also spaced from each other as to receive the cushion assembly therebetween. Further, the void or spacings between stanchions mounted upon a common carriage are in alignment with the spacing between the stanchions of the other carriage wherein an elongated space or slot is defined by the stanchions 47 and 49 capable of receiving the backed cushion assembly.

A cam roller 56 is mounted on each of the T-brackets 44 for the carriages 40 and 42. The cam rollers 56 are received in one of the cam slots 58, FIG. 4, defined in the cam plate 34. As will be appreciated from FIG. 4, the cam slots 58 are obliquely related to each other, and as will be later appreciated, the configuration of the cam slots 58 is determined by the extent of stretching of the cushion cover desired during assembly.

Figure 5:
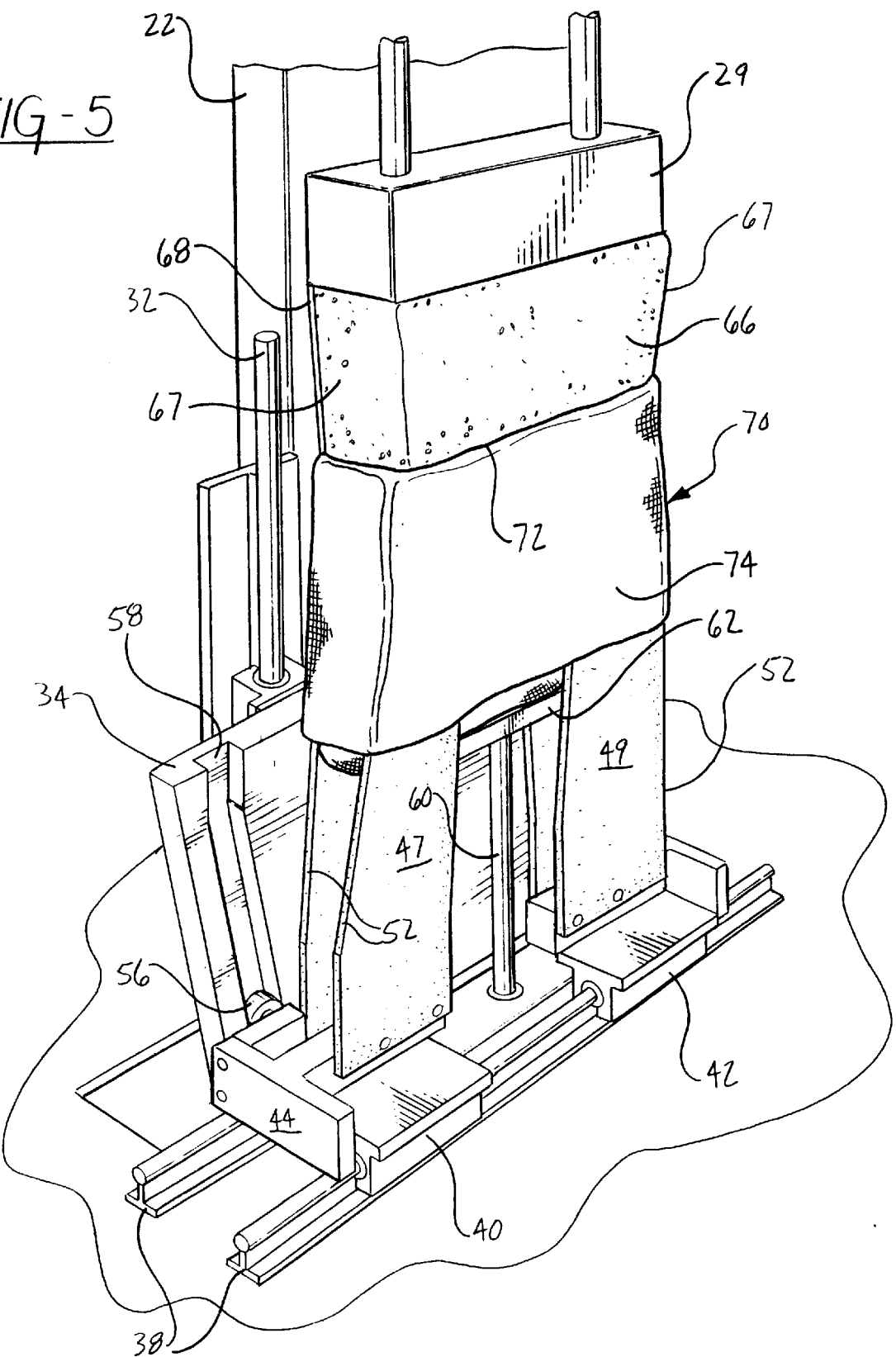
FIG. 5 is a perspective view similar to FIG. 3 illustrating a partial assembly of the foam cushion and the cover, the cover being mounted upon the stanchions and partially received upon the cushion.

An ejector rod 60, FIG. 5, extends upwardly through the table element 18 in alignment with the ram piston 26. The ejector rod 60, at its upper end, includes an ejector head 62 located between the stanchions 46, FIG. 3, and the ejector rod 60 is affixed at its end 64 to the lower end of the cam plate 34 whereby the ejector rod 60 will raise and lower in conjunction with the movement of the cam plate 34 and the ram piston 26.

In operation, the ram 24 will be operated to raise the piston 26 its maximum degree. In such instance, the cam plate 34 will be raised to the maximum extent as will the ejector rod 60. A foam cushion 66 having a rigid backing 68 is then affixed to the cushion anchor 29 mounted to the ram piston head 28. As will be appreciated from the dotted lines in FIG. 1, the cushion 66 includes tapered lateral edges 67, and upon mounting the cushion and backing plate assembly to the cushion anchor 29, the cushion will be disposed above the stanchions 46 as shown in FIG. 3.

The cushion cover 70 which is in the form of a closed end tube or pocket, and is formed of a stretchable material such as fabric, vinyl, leather or the like, is turned inside out and placed over the upper edges 52 of the stanchions 46 in a manner that will be appreciated from FIG. 5. Turning the cover 70 inside out forms an open upwardly extending pocket 72 in alignment with the lower edge of the cushion 66, and the pocket 72 extends between stanchions 47 and 49. The majority of the cover is then pulled down over the outside of the stanchions 47 and 49 and over outer edges 52.

Once the cover 70 is located on the stanchions 46 so that the pocket 72 is in alignment with the lower edge of the cushion 66, the ram 24 is energized with compressed air to move the piston 26 downwardly toward the frame assembly portion 14. As the cushion 66 moves downwardly, its lowermost end will enter the cover pocket 72, and the cushion will enter the slot between stanchions 47 and 49. As the cushion 66 is continued to be pushed between the stanchions 47 and 49, the engagement of the lower end of the cushion 66 with the cover 70 will push the cushion into the cover pocket pulling the cover envelope over the stanchion top edges 48 as the cover encompasses that portion of the cushion located between stanchions 47 and 49 as shown in FIG. 5.

Simultaneously with the lowering of the cushion 66, the stanchions 47 and 49 will be moving outwardly away from each other due to the lowering movement of the cam plate 34 and the force exerted on the carriages 40 and 42 by the cam rollers 56 due to the oblique configuration of the cam slots 58. Thus, as the cushion 66 is lowering, the cover 70 will be laterally stretched by the stanchion outer edges 52 simultaneously with the cover being pulled upon the backing and cushion assembly. The degree of stretching of the cover 70 that occurs during assembly of the cover with the cushion is determined by the configuration of the cam slots 58, and the configuration of the stanchions' outer edges 52. The configuration of the cam slots 58 and the stanchion outer edges 52 will be determined by the lateral configuration of the backing and cushioning assembly being covered so that the cover will be properly stretched to permit a wrinkle-free assembly with the backing and cushion assembly.

The ram 24 will continue to lower the cushion assembly 66 until all of the cover portion 74 has been pulled into the slot between stanchions 47 and 49 which will complete the covering of the cushion assembly 66.

After the cushion assembly 66 has been completely encased within the cover 70, the ram 24 is retracted upwardly. This upward movement of the piston 26 simultaneously moves the ejector rod 60 upwardly causing the ejector head 62 to engage the lowermost portion of the covered cushion assembly lifting the cushion assembly from between stanchions 46 so that when the piston 26 is fully retracted, the covered cushion assembly may be removed from its cushion anchor 29. The procedure may now be repeated to cover another cushion assembly as the carriages 40 and 42 will be moved to their closest position relative to each other, FIG. 3, and another inside out cover 70 may be placed over the stanchions 46.

As the lateral dimensions of the backing and cushion assembly may vary considerably between products, the ability of the cam plate 34 to define any desired configuration of cam slot 58 permits optimum cover stretching to be achieved depending on the lateral configuration of the backing and cushion assembly. Accordingly, the apparatus of the invention provides a flexibility and customizing of cushion and cover assembly not heretofore possible.

It is appreciated that various modifications to the inventive concepts may be apparent to those skilled in the art without departing from the spirit and scope of the invention.

What is claimed is:

1. Apparatus for assembling a stretchable pocket cover over a foam cushion comprising:

an elongated frame having a ram portion in alignment with an assembly portion and a longitudinal axis;

said assembly portion including first and second carriages movably mounted on elongated guides transversely disposed to said longitudinal axis of the frame length;

said carriages being capable of moving toward and away from each other;

a cam follower mounted on each carriage;

a pair of opposing, substantially parallel plate-like, planar stanchions cantilever mounted on each carriage having free ends extending toward said ram portion and each of said pair of stanchions transversely aligned with respect to said longitudinal axis of said frame;

said foam cushion simultaneously received between said pair of stanchions on each of said carriages such that a longitudinal axis of said cushion is substantially parallel to said planar stanchions;

said stanchions receiving said pocket cover in an inside-out fashion over said free ends; and a ram mounted on said frame and movable toward and away from said assembly portions and a pair of cams movably in synchronization with said ram in engagement with said cam followers whereby the cover will be stretched by said stanchions as controlled by said cams and cam followers as said ram pushes the cushion between said stanchions and the cover folds over said free ends of said stanchions to cover the cushion.

2. The apparatus for assembling a stretchable pocket cover over a foam cushion as in claim 1, farther comprising:

said pair of cams being formed on a cam plate;

cam plate guides mounted on said frame substantially parallel to the length of said frame movably supporting said cam plate; and said cam plate being operatively connected to said ram for movement therewith.

3. The apparatus for assembling a stretchable pocket cover over a foam cushion as in claim 1, further comprising:

said stanchions having an outer end configuration related to the configuration of the cushion to effectively stretch the cover during assembly.

4. The apparatus for assembling a stretchable pocket cover over a foam cushion as in claim 1, further comprising:

an ejector rod mounted on said frame and movable with said ram; and said ejector rod having a head located intermediate said stanchions engageable with the cushion and cover to remove the cushion and cover from between said stanchions during movement of said ram away from said assembly portion.

5. The apparatus for assembling a stretchable pocket cover over a foam cushion as in claim 4, further comprising:

said ram being air operated.

6. The apparatus for assembling a stretchable pocket cover over a foam cushion as in claim 1, further comprising:

said stanchions comprising flat plates each having an outer edge configuration determined by the lateral configuration of the foam cushion.

* * * * *

UNITED STATES PATENT AND TRADEMARK OFFICE
CERTIFICATE OF CORRECTION

PATENT NO.   : 6,453,529 B1
DATED        : September 24, 2002
INVENTOR(S)  : Bentschneider It is certified that error appears in the above-identified patent and that said Letters Patent is hereby corrected as shown below:

Column 1,
Line 24, capitalize the letter "O" in the word "Obtaining".
Line 65, delete "be" after the word "to"

Signed and Sealed this

Twenty-eighth Day of January, 2003

JAMES E. ROGAN
*Director of the United States Patent and Trademark Office*